UNITED STATES PATENT OFFICE.

CLARENCE P. LINVILLE, OF SOUTH AMBOY, NEW JERSEY, ASSIGNOR TO AMERICAN SMELTING & REFINING CO., A CORPORATION OF NEW JERSEY.

PROCESS OF PURIFYING ARSENIC TRIOXID.

1,372,443.  Specification of Letters Patent.  Patented Mar. 22, 1921.

No Drawing. Application filed July 21, 1916, Serial No. 110,478. Renewed December 18, 1919. Serial No. 345,882.

*To all whom it may concern:*

Be it known that I, CLARENCE P. LINVILLE, a citizen of the United States, and resident of South Amboy, in the county of Middlesex and State of New Jersey, have invented certain new and useful Improvements in Processes of Purifying Arsenic Trioxid, of which the following is a specification.

My invention relates in general to a distilling process for separating selenium, tellurium and like volatile metals from other volatile bodies and specifically relates to a process for removing coloring matter from arsenic compounds, such as arsenic trioxid, containing selenium or tellurium, as impurities. In its commercial aspect the invention relates to a perfected process for collecting selenium and for obtaining white arsenic from the residues remaining from smelting and other pyrometallurgical operations, which residues usually contain small percentages of discoloring agents such as selenium and tellurium.

In the blast furnace treatment of ores containing arsenic, a large portion of the arsenic is volatilized and passes, together with other volatile and free bodies from the furnaces in the top gases and is suitably collected as a residue for further treatment. This residue is refined roughly by heating the same on the hearth of a large coke fire reverberatory roasting furnace under temperature conditions sufficient to volatilize the arsenic trioxid present. The gases from the furnace are passed through a series of flues and condensing chambers where the arsenic trioxid and certain other foreign bodies are condensed. By this method, however, small amounts of selenium, tellurium and the like, hereinafter collectively designated as selenium, distil with the arsenic trioxid. While this selenium in the quantities usually present has but little effect upon the arsenic when considered chemically or when used in insecticides, still the presence of even minute quantities of this metal has the effect of rendering the sublimate red or pink in color which discoloration seriously affects its salable possibilities for the trade demands a "white arsenic."

The presence of selenium is also detrimental to the use of arsenic in glass mixtures owing to the coloring effect which the selenium has on the resulting glass.

Numerous attempts have been made to obtain a selenium-free arsenic trioxid from this furnace residue. Attempts have been made to dissolve the selenium from the arsenic and to dissolve the arsenic from the selenium and recover the arsenic by recrystallization. These attempts have been unsuccessful, due among other causes, to the difficulty of placing all of the different substances present in solution, to the expense of the solvent necessary, and to the presence of other impurities usually found in this residue and which act to render the process imperfect especially from a commercial standpoint.

The invention may be regarded as having two features: first, to provide a simple process for bleaching "white arsenic" and second, to provide a simple process for holding selenium, and the like, in a non-volatile state under heat conditions at which this metal is usually volatile.

In order to effect these objects I propose to distil and sublime the arsenic-selenium compound as is practised at present, except that a reagent is added which will combine with all of the selenium present to form a non-volatile compound at the distilling temperature of the arsenic trioxid and in this way the selenium can be held back and the arsenic trioxid permitted to distil and sublime free of the presence of any selenium.

One means for effecting this action is to add a reagent to the distilled gases from the residue to cause the selenium present to form a selenid which will remain stable even in the presence of the large amount of arsenic usually present. It has been found in practice that of the available metals, metallic silver gives perhaps the best results, but it is obvious that other metal or substance such as copper, gold, iron and lead or compounds thereof may be utilized provided it will form with the selenium present a compound non-volatile at the temperature at which the arsenic trioxid distils. It is not necessary to the success of the operation that the metal reagent be pure.

One improved commercial method for carrying out the process above suggested is to grind the reagent and mix this ground reagent with the impure selenium containing arsenic body. It is obvious that the proportions are immaterial, provided there is sufficient metal available to combine with all of the selenium present. The mixture is charged into a refining furnace, the temperature of which is between 400 and 1200° F., preferably at about 900° F. and the arsenic gases permitted to pass off as is usual with operations of this character. Preferably the operation takes place in the presence of an excess of air to prevent the formation of any carbon monoxid.

This same process may be carried out experimentally in the laboratory by placing an artificial mixture of arsenic trioxid, containing about 0.1% selenium or tellurium, in the bottom of a test tube; placing a layer of glass wool on top of the arsenic compound and a layer of silver, preferably in a finely divided state, on the wool. Gently heating the lower portion of the test tube will cause a perfectly white arsenic sublimate to form on the upper part of the test tube. On analysis not even a trace of the selenium or tellurium is found in the arsenic trioxid sublimate formed on the tube.

In this case and possibly in both of the methods herein suggested, the silver or other metal containing reagent may be regarded as a chemical filter which acts to absorb and retain the selenium while permitting the arsenic to pass through unaffected by the filtering material.

Having thus described my invention, I claim:

1. In the art of rendering selenium non-volatile in the presence of a volatile substance, the process which consists in heating the selenium in the presence of a substance capable of forming non-volatile selenium compounds and distilling the volatile substance at a temperature lower than any temperature that may affect the stability of the selenium compound.

2. In the art of removing coloring matter from arsenic trioxid mixtures which contain selenium or the like, the process which consists in combining the selenium present in the mixture with an agent capable of forming a non-volatile selenid at a relatively low temperature and subjecting the arsenic trioxid and selenid mixture to a temperature sufficiently high to distil the arsenic trioxid present but lower than any temperature which might affect the stability of the non-volatile selenid.

3. In the art of subliming a mixture containing arsenic trioxid and selenium, the process which includes the subjecting of the mixture to the action of a substance which will combine with the selenium to form a non-volatile compound therewith stable at the volatilizing temperature of the arsenic trioxid present whereby the selenium is held back and the arsenic trioxid permitted to distil when subjected to the distilling temperature of arsenic trioxid.

4. The process which consists in heating a composition containing selenium and another volatile substance to a temperature sufficient to gasify the selenium and the other volatile substance, and causing the resulting gases to be brought into contact with an agent capable of reacting on the selenium to form a non-volatile compound.

5. The process which consists in heating a composition containing arsenic trioxid and selenium to a temperature sufficient to distil the arsenic trioxid in the presence of a substance capable of uniting with the selenium to form a compound non-volatile at said temperature.

6. The process which consists in mixing silver with a substance containing a volatile body and selenium and subjecting the mixture to a heating action to distil off the volatile body.

7. The process which consists in mixing silver with a substance containing a volatile arsenic compound and selenium and subjecting the mixture to a heating action to distil off the arsenic compound.

8. The process which consists in introducing an arsenic-selenium containing substance together with a silver containing body into a reverberatory furnace, heating the furnace and maintaining the temperature at between 400 and 1200° F. for a period of time and collecting the material sublimed during this period.

9. The process which consists in subjecting a substance containing an oxid of arsenic and selenium to a heat treatment at a temperature sufficiently high to cause a distilling of the arsenic oxid and selenium, and causing the gases while hot to be brought into contact with a silver containing body thereby to effect a separation of the selenium from the volatile arsenic oxid.

10. The process which consists in subjecting a substance containing an oxid of arsenic and selenium to a heat treatment at a temperature sufficiently high to cause a distilling of the arsenic oxid and selenium, and causing the gases while hot to be brought into contact with a silver containing body thereby to effect a separation of the selenium from the volatile arsenic oxid, said silver containing body being in a finely divided state.

11. The process which consists in mixing an arsenic oxid containing selenium with silver and subjecting the mixture to a distilling and subliming process.

12. The process which consists in mixing an arsenic oxid containing selenium with finely ground silver and subjecting the mixture to a distilling and subliming process in the presence of an excess of air to prevent the reduction of the arsenic oxid present.

13. The process which consists in subjecting a mixture containing an arsenic oxid and selenium to a temperature of approximately 900° F. in the presence of an excess of air and in the presence of a substance capable of uniting with the selenium to form a compound non-volatile at 900° F.

14. The process which consists in subjecting a mixture containing an arsenic oxid and selenium to a temperature of approximately 900° F. in the presence of a substance capable of uniting with the selenium to form a compound non-volatile at 900° F. and condensing the resulting gases.

Signed at Maurer in the county of Middlesex and State of New Jersey this 14th day of July, A. D. 1916.

CLARENCE P. LINVILLE.

Witnesses:
   G. M. F. FAIRCLOTH,
   THEO. H. DRUDING.